United States Patent [19]

Takarada et al.

[11] Patent Number: 5,583,535
[45] Date of Patent: Dec. 10, 1996

[54] COLUMN ELECTRODE DRIVE CIRCUIT OF LIQUID CRYSTAL DISPLAY DEVICE CAPABLE OF SIMULTANEOUSLY APPLYING DISPLAY VOLTAGES TO COLUMN ELECTRODES AS WELL AS SEQUENTIALLY APPLYING SCANNING VOLTAGES TO COLUMN ELECTRODES

[75] Inventors: Takeshi Takarada, Tenri; Junji Kawanishi, Nara, both of Japan

[73] Assignee: Sharp Kabushiki Kaisha, Osaka, Japan

[21] Appl. No.: 292,196

[22] Filed: Aug. 19, 1994

[30] Foreign Application Priority Data

Aug. 24, 1993 [JP] Japan ...................... 5-209370

[51] Int. Cl.$^6$ ...................................................... G09G 3/36
[52] U.S. Cl. ............................. 345/99; 345/104; 345/182
[58] Field of Search ............................... 345/104, 87, 92, 345/98, 99, 100, 173, 175, 182, 205, 213; 178/18

[56] References Cited

U.S. PATENT DOCUMENTS

| 4,679,909 | 7/1987 | Hamada ................................ 345/104 |
| 4,804,951 | 2/1989 | Yamashita et al. ...................... 345/205 |
| 4,839,634 | 6/1989 | More et al. . | |
| 5,103,218 | 4/1992 | Takeda .................................. 345/100 |
| 5,151,688 | 9/1992 | Tanaka et al. ........................ 345/182 |
| 5,194,852 | 3/1993 | More et al. . | |
| 5,270,711 | 12/1993 | Knapp .................................. 345/104 |
| 5,313,222 | 5/1994 | Lee ...................................... 345/100 |
| 5,392,058 | 2/1995 | Tagawa ................................ 345/104 |
| 5,440,323 | 8/1995 | Okada .................................. 345/98 |

FOREIGN PATENT DOCUMENTS

| 0497378A2 | 8/1992 | European Pat. Off. . |
| 3-294919 | 12/1991 | Japan . |
| 4-283819 | 10/1992 | Japan . |

Primary Examiner—Steven Saras
Attorney, Agent, or Firm—Nixon & Vanderhye P.C.

[57] ABSTRACT

There is provided a column electrode drive circuit applicable to a display-integrated type tablet. A hold circuit has a plurality D-flip-flops. To clock terminals of the flip-flops is input an output signal of an AND circuit which receives inputs of a hold signal and a clock signal. To data terminals of the flip-flops are input sampled display signals. With the above-mentioned arrangement, when the hold signal is at "H" level, the sampled display signals are sequentially output as display signals without modification based on the clock signal. When the hold signal is a pulse signal, the sampled display signals are simultaneously output and held as the display signals. By thus making a simultaneous output function and a sequential output function compatible, the column electrode drive circuit can be utilized as a column electrode drive circuit for the display-integrated type tablet device.

8 Claims, 10 Drawing Sheets

FIG. 7
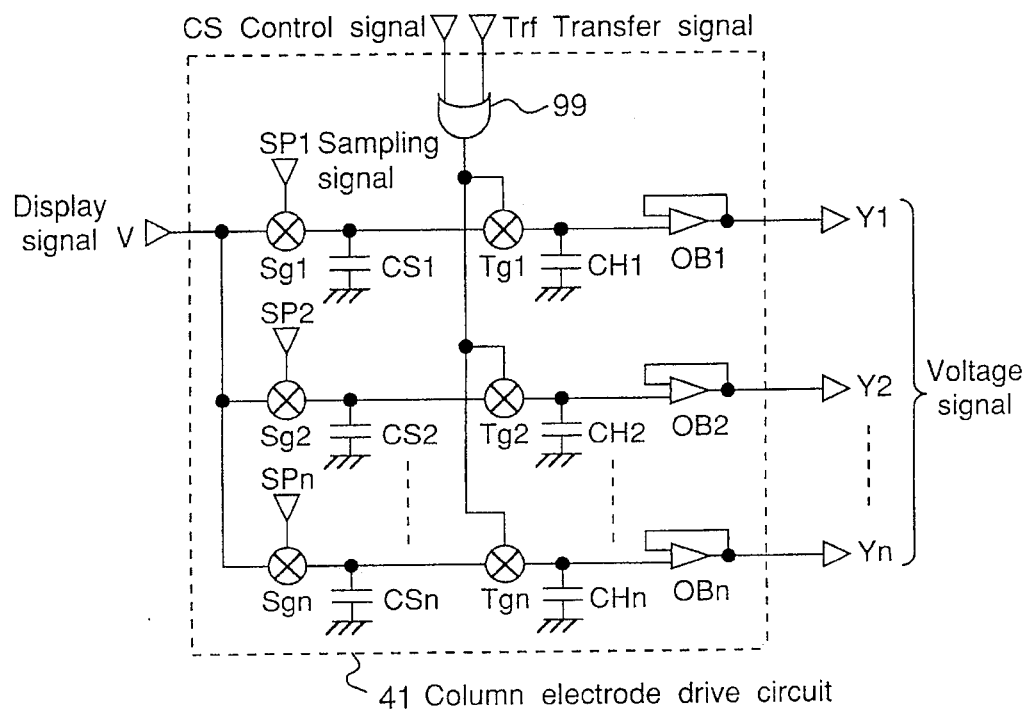
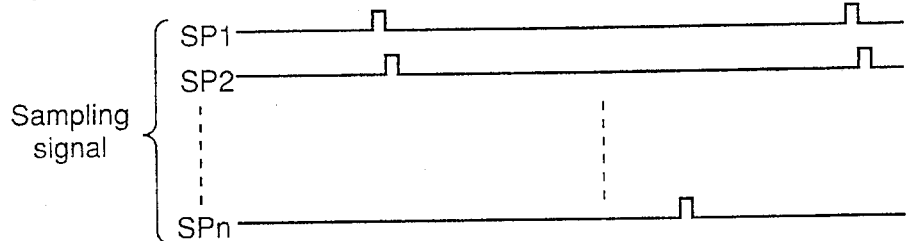
FIG. 8A Horizontal sync signal HS
FIG. 8B Sampling signal { SP1, SP2, ... SPn }
FIG. 8C Transfer signal Trf

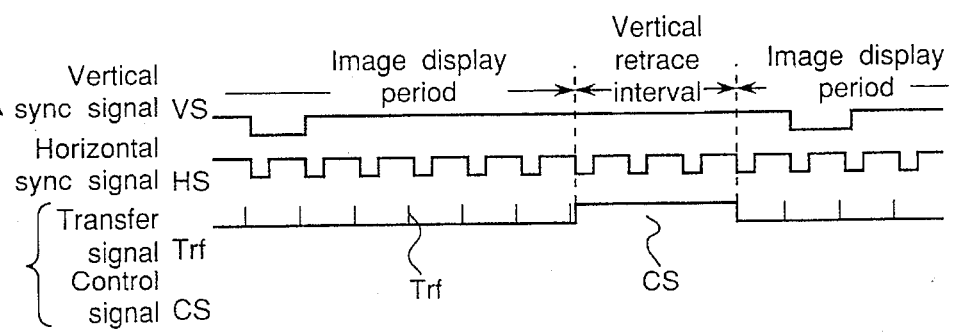
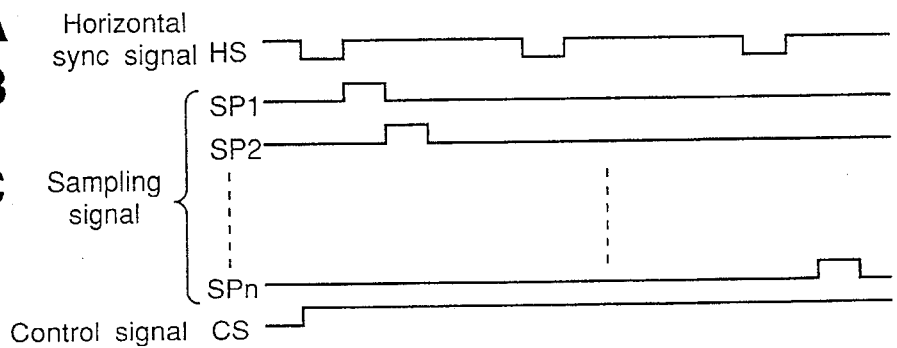

COLUMN ELECTRODE DRIVE CIRCUIT OF LIQUID CRYSTAL DISPLAY DEVICE CAPABLE OF SIMULTANEOUSLY APPLYING DISPLAY VOLTAGES TO COLUMN ELECTRODES AS WELL AS SEQUENTIALLY APPLYING SCANNING VOLTAGES TO COLUMN ELECTRODES

BACKGROUND OF THE INVENTION

1. Field of the Invention

The present invention relates to a column electrode drive circuit of a liquid crystal display device, and more particularly to a column electrode drive circuit of an active matrix type liquid crystal display device.

2. Description of the Prior Art

Conventionally, an active matrix type liquid crystal display device in which a switching transistor is additionally provided for each pixel of a display panel has been extensively used as a display device for a pocketable information apparatus or the like for the reason that a high contrast can be obtained by the switching function of the transistor even when multi-line multiplex drive is executed.

FIG. 14 is a block diagram showing the generic construction of the active matrix type liquid crystal display device.

Referring to FIG. 14, a switching transistor 1-d is connected to a pixel 1-c provided at an intersection of a row electrode 1-a and a column electrode 1-b on one of two substrates which are arranged opposite to each other at a specified distance to constitute part of an LCD panel 1. A row electrode drive circuit 2 sequentially applies to each row electrodes 1-a a scanning pulse for sequentially turning on each switching transistor 1-d connected to each of plural number of row electrodes 1-a arranged in parallel with each other. Meanwhile, a column electrode drive circuit 3 applies simultaneously to every column electrode 1-b a voltage corresponding to the density of an image to be displayed on each pixel 1-c relevant to one row electrode 1-a.

A control circuit 4 controls the row electrode drive circuit 2 and the column electrode drive circuit 3 to display an image on a pixel matrix on the LCD panel 1.

FIG. 11 is a block diagram showing the internal construction of the column electrode drive circuit 3 shown in FIG. 14, while FIGS. 12a–12f are timing charts of signals in the column electrode drive circuit 3.

The following describes the operation of the column electrode drive circuit 3 based on FIGS. 11 and 12a to 12f.

Referring to FIG. 11, the column electrode drive circuit 3 is composed of a shift register circuit 5, a sampling circuit 6, a hold circuit 7, and a level selector circuit 8. The shift register circuit 5, sampling circuit 6, hold circuit 7, and level selector circuit 8 are each composed of a number of elements corresponding to the number of "n" of the column electrodes 1-b.

A display signal D input to each element of the sampling circuit 6 is a signal representing the density of an image to be displayed on each pixel. The display signal D is normally input serially one pixel by one pixel in a manner as shown in FIG. 12c. Therefore, by means of the shift register circuit 5 and the sampling circuit 6, display signals D1 through Dn in an interval corresponding to the pixels 1-c on which the image is to be displayed are extracted from the display signal D input serially.

The shift register circuit 5 sequentially shifts a sampled signal SP in accordance with a shift clock CK to yield output signals SP1 through SPn from each element thereof to the corresponding element of the sampling circuit 6. Then each element of the sampling circuit 6 sequentially samples the display signals D1 through Dn corresponding to respective column electrodes 1-b according to the output signals SP1 through SPn input thereto, and outputs sampled display signals S1 through Sn to the corresponding element of the hold circuit 7.

Each element of the hold circuit 7 simultaneously outputs the display signals S1 through Sn as display signals H1 through Hn to the corresponding element of the level selector circuit 8 in synchronization with a hold signal LS. Simultaneously with the above-mentioned operation, the hold circuit 7 holds the display signals H1 through Hn.

Each element of the level selector circuit 8 selects a voltage at a level to be supplied to each column electrode 1-b among "m" number of levels of input voltages V1 through Vm supplied externally based on the input display signals H1 through Hn, and outputs the voltage at the selected level as each of voltage signals Y1 through Yn to the corresponding column electrode 1-b.

When the voltages V1 through Vm based on the voltage signals Y1 through Yn are thus applied to the column electrodes 1-b, the voltages V1 through Vm are applied to the pixels 1-c via each switching transistor 1-d which is in "ON" state as connected with the row electrode 1-a to which the scanning pulse is applied by the operation of the row electrode drive circuit 2. As a result, a variable-density image corresponding to the display signals D1 through Dn is displayed on one line of the pixel matrix of the LCD panel 1.

FIG. 13 is a generic circuit diagram of the hold circuit 7.

The hold circuit 7 has D-flip-flops 9, 10, . . . , 11 as the aforementioned elements. Then, in synchronization with the hold signal LS input to clock terminals CK of the D-flip-flops 9 through 11, the sampled display signals S1 through Sn which are input to data terminals D are simultaneously output as the display signals H1 through Hn, while the display signals H1 through Hn are held.

As described above, the column electrode drive circuit 3 of the liquid crystal display device simultaneously applies the voltages V1 through Vm which have the levels selected by the level selector circuit 8 in synchronization with the timing of the hold signal LS to the liquid crystals of each pixel via the switching transistor 1-d which is in "ON" state according to the scanning pulse from the row electrode drive circuit 2.

In other words, the voltages are simultaneously applied to the column electrodes 1-b in units of scanning of the row electrode 1-a.

There is a display-integrated type tablet device obtained by incorporating a tablet function in addition to the aforementioned image display function into the aforementioned liquid crystal display device.

In the display-integrated type tablet device, one field is divided into an image display period in which an image is displayed on the pixel matrix of the LCD panel and a coordinate detection period in which the coordinate values at a designated point on the LCD panel are detected. In the coordinate detection period, a scanning pulse is sequentially applied to the row electrodes 1-a and the column electrodes 1-b, and the scanning pulse applied to each electrode is detected by means of an electronic pen which is electrostatically coupled with each row electrode 1-a and each column electrode 1-b.

Then, according to the scanning timing of each electrode group and a time to the detection of the scanning pulse by the electronic pen, the coordinate values at the tip end of the electronic pen on the LCD panel are detected.

In the above case, the detection of the x-coordinate at the tip end of the electronic pen is executed by sequentially scanning the column electrodes 1-b in the coordinate detection period. Therefore, it is indispensable for the column electrode drive circuit of the display-integrated type tablet device to have a function of simultaneously applying display voltages to the column electrodes in units of scanning of a row electrode in the image display period as well as a function of scanning the column electrodes by sequentially applying the scanning voltage to the column electrodes in the coordinate detection period.

Unfortunately, as described above, the column electrode drive circuit 3 of the conventional liquid crystal display device has only the function of simultaneously changing in synchronization with the hold signal LS the voltages of the voltage signals Y1 through Yn output to all the column electrodes, and therefore the voltages of the voltage signals Y1 through Yn cannot be changed sequentially.

For the above reasons, there has been the problem that the row electrode drive circuit 2 of the conventional liquid crystal display device cannot be utilized as a column electrode drive circuit for the display-integrated type tablet device.

Even when the scanning pulse for the x-coordinate detection is sequentially applied to the column electrodes, since the shift clock signal CK has an excessively high shift speed in the conventional liquid crystal display device when the device is not modified, and a time difference in the change of electric potential between an arbitrary column electrode and the adjacent column electrode is about several hundred nanoseconds, it is very difficult to detect the x-coordinate value of an arbitrary column electrode based on a relation in phase between the change of electric potential at the column electrode and a horizontal sync signal, and the like.

SUMMARY OF THE INVENTION

The object of the present invention is therefore to provide a column electrode drive circuit of a liquid crystal display device applicable to the display-integrated type tablet device.

In order to achieve the aforementioned object, there is provided a column electrode drive circuit of a liquid crystal display device, said column electrode drive circuit having a sampling circuit for sequentially sampling a display signal corresponding to a pixel in synchronization with a clock signal, a hold circuit for holding the display signal sampled, and an output circuit for outputting to a column electrode a voltage signal corresponding to the display signal held, said pixels of a column of a pixel matrix being connected to said column electrode via respective switching elements, wherein the hold circuit has a plurality of flip-flops which are arranged in parallel with each other and hold the display signals input from the sampling circuit in synchronization with a hold signal supplied to a clock terminal of each of the flip-flops to simultaneously output the display signals, and hold the display signals sequentially input from the sampling circuit in synchronization with the clock signal supplied to the clock terminal to sequentially output the display signals, and a clock signal supply circuit for supplying the clock signal to the clock terminal of each of the flip-flops.

According to the present invention, the display signals corresponding to the pixels on which an image is to be displayed are sequentially sampled in synchronization with the clock signal by the sampling circuit. Then by the flip-flops in the hold circuit, the display signals input from the sampling circuit in synchronization with the hold signal supplied to each clock terminal are held and simultaneously output. Subsequently, the voltage signals corresponding to the output display signals are output from the output circuit, and the voltage signals are simultaneously applied to the column electrodes.

Thus, the voltage signals corresponding to the display signals sampled by the sampling circuit are simultaneously applied to the column electrodes connected to the switching elements respectively provided for pixels of the pixel matrix to display an image on one line of the pixel matrix.

Meanwhile, when the clock signal is applied to the clock terminals of the flip-flops by the clock signal supply circuit, the flip-flops hold the display signals sequentially input from the sampling circuit in synchronization with the clock signal and sequentially output the display signals. Then the voltage signals corresponding to the output display signals are sequentially output from the output circuit, and then sequentially applied to the column electrodes.

When the clock signal is thus supplied to the clock terminals of the flip-flops, the voltage signals are applied to the column electrodes to scan the column electrodes.

In an embodiment, the clock signal supply circuit is a signal selector circuit which takes in the hold signal and the clock signal to select and output the hold signal to the clock terminal of each of the flip-flops in an image display period, and to select and output the clock signal to the clock terminal in a vertical retrace interval.

According to the above embodiment, the hold signal is selected by the signal selector circuit in the image display period in which an image is displayed on the pixel matrix, and then supplied to the clock terminals of the flip-flops of the hold circuit. Then the display signals input from the sampling circuit in synchronization with the hold signal are held by the flip-flops, and then simultaneously output. Then the voltage signals corresponding to the output display signals are simultaneously applied to the column electrodes.

Meanwhile, in the vertical retrace interval which is provided in between the image display periods and in which no image is displayed on the pixel matrix, the clock signal is selected by the signal selector circuit, and then supplied to each clock terminals. Then the flip-flops hold the display signals sequentially input from the sampling circuit, and then sequentially output the signals. Then the voltage signals corresponding to the output display signals are sequentially applied to the column electrodes.

Thus in the vertical retrace interval, based on the display signals from the sampling circuit sequentially output from the hold circuit, the voltage signals are sequentially applied to the column electrodes to scan the column electrodes.

In an embodiment, there is further provided a frequency divider circuit which takes in a shift clock signal to divide a frequency of the shift clock signal by a specified number to output a frequency-divided clock signal, and a switching circuit which selects the frequency-divided clock signal from the frequency divider circuit as the clock signal in the vertical retrace interval and selects the shift clock signal as the clock signal in the image display period based on an external switching signal to switchingly output the frequency-divided clock signal or the shift clock signal, said sampling circuit sequentially sampling the display signal on a cycle of the frequency-divided clock signal longer than a cycle of the shift clock signal based on the frequency-divided clock signal in the vertical retrace interval, and said hold circuit taking the frequency-divided clock signal in the clock terminal of each of the flip-flops and sequentially outputting the display signals sequentially sampled on the cycle of the frequency-divided clock signal by the sampling circuit to the output circuit based on the frequency-divided clock signal in the vertical retrace interval.

According to the embodiment, the frequency of the shift clock signal is divided by a specified number by the frequency divider circuit to output a frequency-divided clock signal. Then based on the external switching signal, the switching circuit selects the shift clock signal in the image display period, and selects the frequency-divided clock signal from the frequency divider circuit in the vertical retrace interval to switchingly output the frequency-divided clock signal or the shift clock signal.

Thus in the vertical retrace interval, the sampling circuit samples the display signals on a cycle of the frequency-divided clock signal longer than the cycle of the shift clock signal based on the frequency-divided clock signal from the switching circuit. Then the hold circuit operates in synchronization with the sampling cycle based on the frequency-divided clock signal to sequentially output the display signals sequentially input from the sampling circuit.

In other words, in the vertical retrace interval, the voltage signals corresponding to the display signals sampled by the sampling circuit are sequentially applied to the column electrodes on a cycle of the frequency-divided clock signal longer than the cycle of the shift clock signal. Therefore, a great time difference can be provided in the change of electric potential between adjoining column electrodes.

There is provided a column electrode drive circuit of a liquid crystal display device, said column electrode drive circuit having a sampling circuit for sequentially sampling a display signal corresponding to a pixel to output a sampled voltage in synchronization with a clock signal, and a hold circuit for holding a voltage corresponding to the sampled voltage sampled by the sampling circuit, whereby the voltage held is applied to a column electrode connected to a switching element provided for each pixel of a pixel matrix, wherein the hold circuit comprises a plurality of transfer gates which are arranged in parallel with each other and simultaneously pass sampled voltages from the sampling circuit in synchronization with a transfer signal input thereto, and sequentially pass the sampled voltages as they are when a control signal is input thereto, and a plurality of hold capacitors which are arranged in parallel with each other and hold electric charges corresponding to the sampled voltages which have passed through the corresponding transfer gates, and a signal selector circuit for selecting the transfer signal or the control signal to output it to the transfer gates.

With the above arrangement, the display signals corresponding to the pixels on which an image is to be displayed are sequentially sampled pixel by pixel in synchronization with the clock signal. Then the transfer gates simultaneously pass the sampled voltages sampled by the sampling circuit in synchronization with the transfer signal. Then electric charges corresponding to the sampled voltages which have passed through the transfer gates are held in the hold capacitors, and the voltages at the levels corresponding to the electric charges held are simultaneously applied to the column electrodes.

When the control signal is input to the transfer gates, the transfer gates pass the sampled voltages sequentially sampled by the sampling circuit as they are. Then electric charges corresponding to the passed sampled voltages are sequentially held in the hold capacitors, and the voltages corresponding to the electric charges held are sequentially applied to the column electrodes.

When the control signal is thus input to the transfer gates, the voltages are sequentially applied to the column electrodes to scan the column electrodes.

In an embodiment, the signal selector circuit is a gate circuit which outputs the transfer signal to the transfer gates in an image display period, and outputs the control signal to the transfer gate in a vertical retrace interval.

According to the embodiment, the transfer signal is supplied to the transfer gates by the gate circuit in the image display period. Then the transfer gates simultaneously pass the sampled voltages in synchronization with the transfer signal, and electric charges corresponding to the passed sampled voltages are held in the hold capacitors.

Thus the voltages at the levels corresponding to the electric charges held simultaneously are simultaneously applied to the column electrodes to display an image on one line.

Meanwhile, in the vertical retrace interval, the control signal is supplied to the transfer gates by the gate circuit. Then the transfer gates pass the sampled voltages as they are, and electric charges corresponding to the passed sampled voltages are sequentially held in the hold capacitors.

Thus the voltages at the levels corresponding to the electric charges held sequentially are sequentially applied to the column electrodes to scan the column electrodes.

In an embodiment, there is further provided a frequency divider circuit which takes in a shift clock signal to divide a frequency of the shift clock signal by a specified number to output a frequency-divided clock signal, and a switching circuit which selects the frequency-divided clock signal from the frequency divider circuit as the clock signal in the vertical retrace interval, and selects the shift clock signal as the clock signal in the image display period based on an external switching signal to switchingly output the frequency-divided clock signal or the shift clock signal, said sampling circuit sequentially sampling the display signal and sequentially outputting the sampled voltages to the transfer gates on a cycle of the frequency-divided clock signal longer than a cycle of the shift clock signal based on the frequency-divided clock signal in the vertical retrace interval.

According to the embodiment, the frequency of the shift clock signal is divided by a specified number by the frequency divider circuit to output a frequency-divided clock signal. Then based on the external switching signal, the switching circuit selects the shift clock signal in the image display period, and selects the frequency-divided clock signal from the frequency divider circuit in the vertical retrace interval to switchingly output the frequency-divided clock signal or the shift clock signal.

Thus in the vertical retrace interval, the sampling circuit samples the display signals on a cycle of the frequency-divided clock signal longer than the cycle of the shift clock signal based on the frequency-divided clock signal. Then the voltages corresponding to the sampled voltages sampled on the long cycle are applied to the column electrodes. Therefore, a great time difference can be provided in the change of electric potential between adjoining column electrodes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a circuit diagram of a column electrode drive circuit of a liquid crystal display device of the present invention, the circuit implemented by an analog circuit;

FIGS. 8a–8c are timing charts of signals in the image display period of the column electrode drive circuit shown in FIG. 7;

FIGS. 9a–9c are charts of the waveform of a transfer signal in the column electrode drive circuit shown in FIG. 7;

FIGS. 10a–10c are timing charts in the vertical retrace interval of the transfer signal having the waveform shown in FIG. 9 in the column electrode drive circuit shown in FIG. 7;

DETAILED DESCRIPTION OF THE PREFERRED EMBODIMENTS

Figure 14:
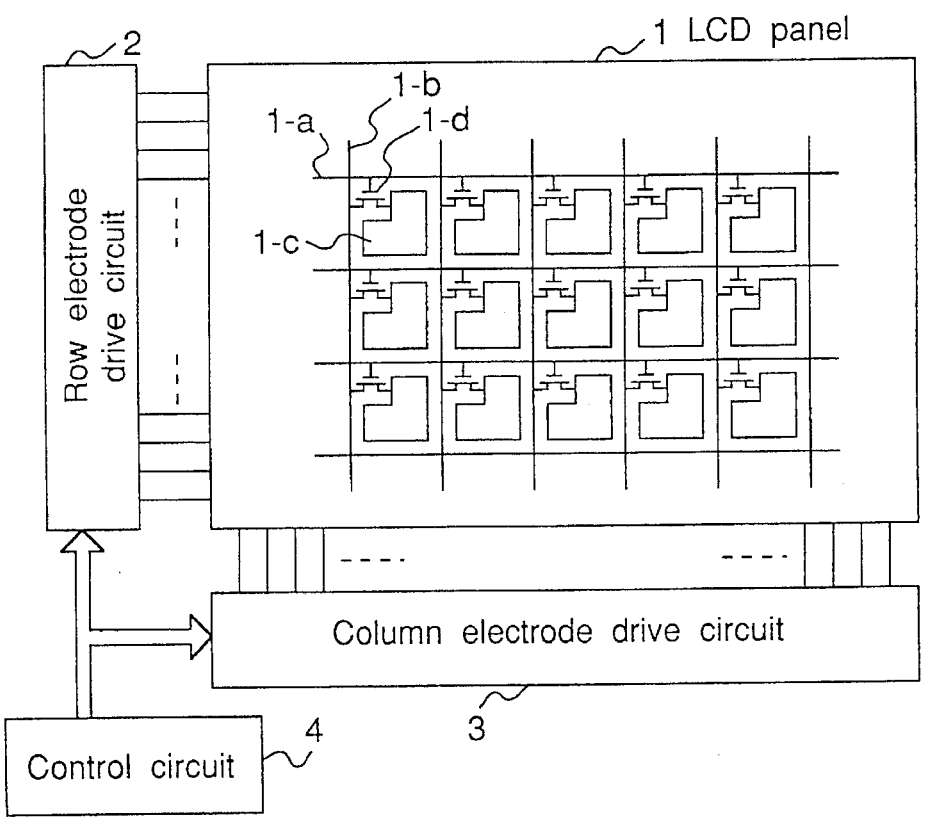
FIG. 14 is a block diagram of an active matrix type liquid crystal display device.

The following describes embodiments of the present invention with reference to the attached drawings. It should be noted that an LCD panel employed in each embodiment has the same construction as that of the LCD panel 1 shown in FIG. 14, and the same reference numerals as in FIG. 14 are used at needed in the following description.

First Embodiment

In the present first embodiment, a column electrode drive circuit is composed of a digital circuit.

Figure 1:
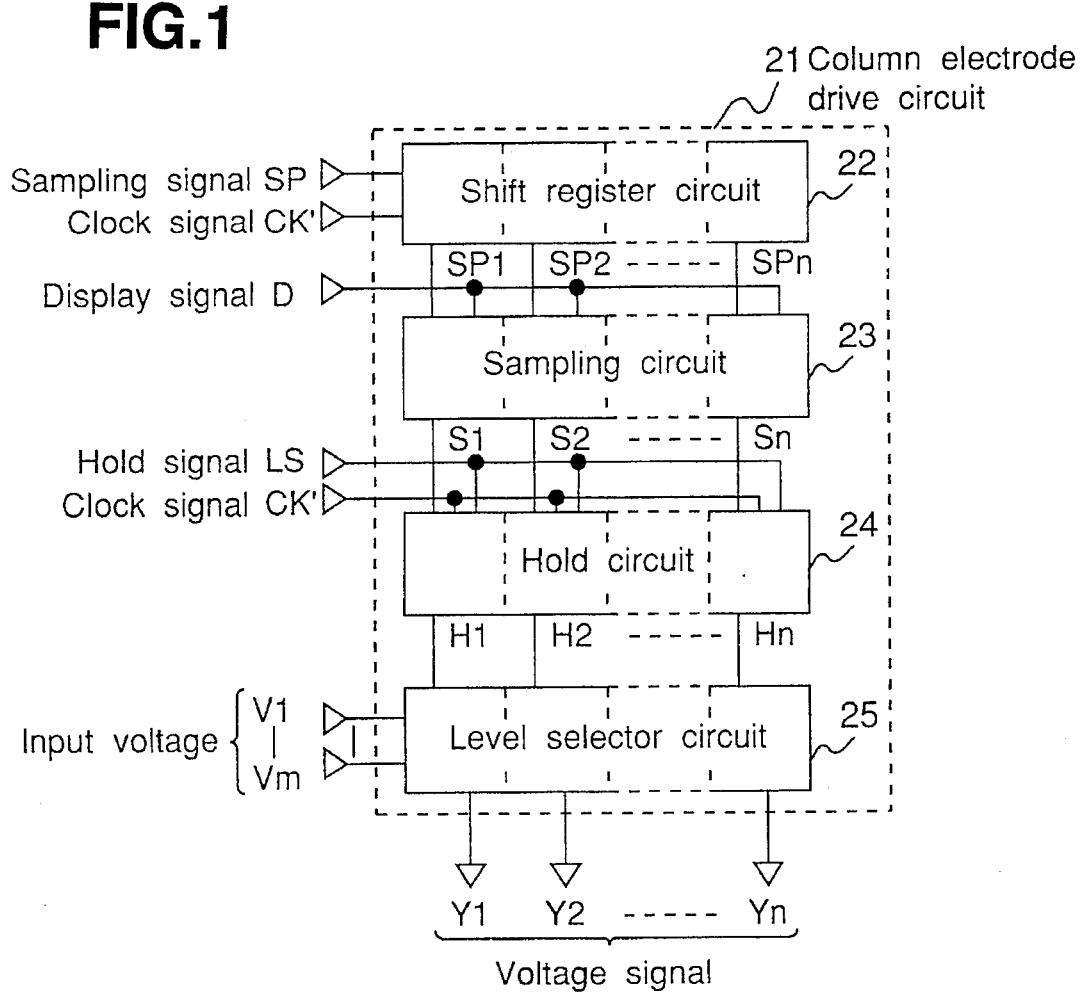
FIG. 1 is a block diagram showing a column electrode drive circuit of a liquid crystal display device in accordance with an embodiment of the present invention.

FIG. 1 shows a block diagram of the column electrode drive circuit 21 in a liquid crystal display device of the present first embodiment.

Figure 11:
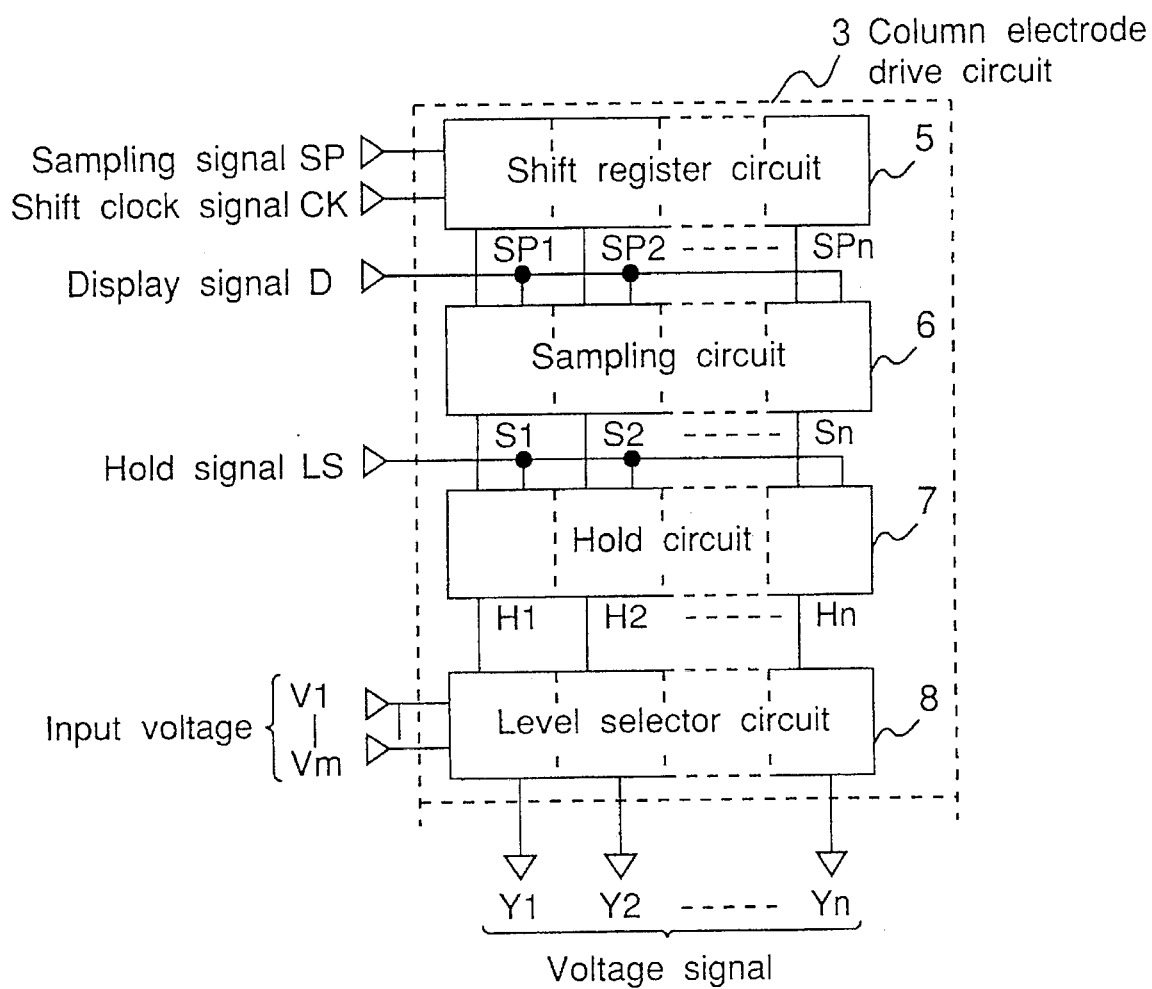
FIG. 11 is a block diagram of a conventional column electrode drive circuit.
Figure 12:
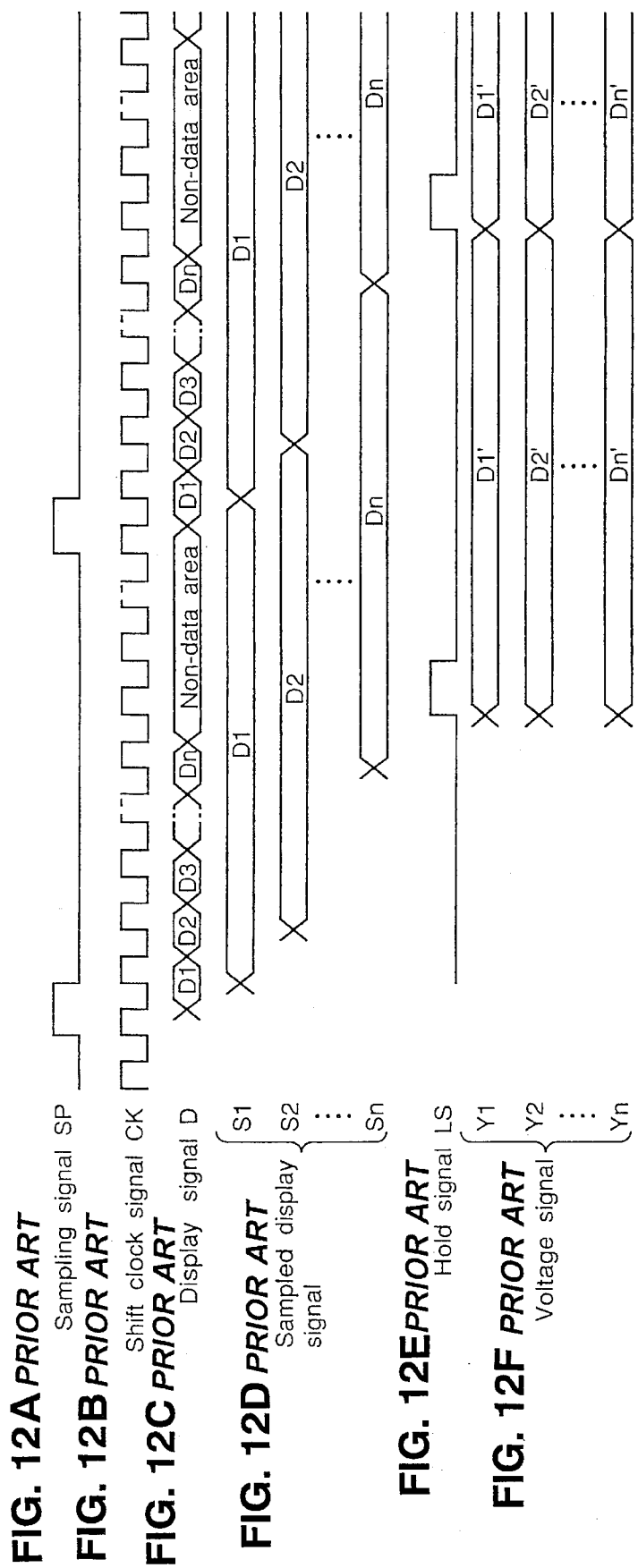
FIGS. 12a–12f are timing charts of signals in the column electrode drive circuit shown in FIG. 11.
Figure 13:
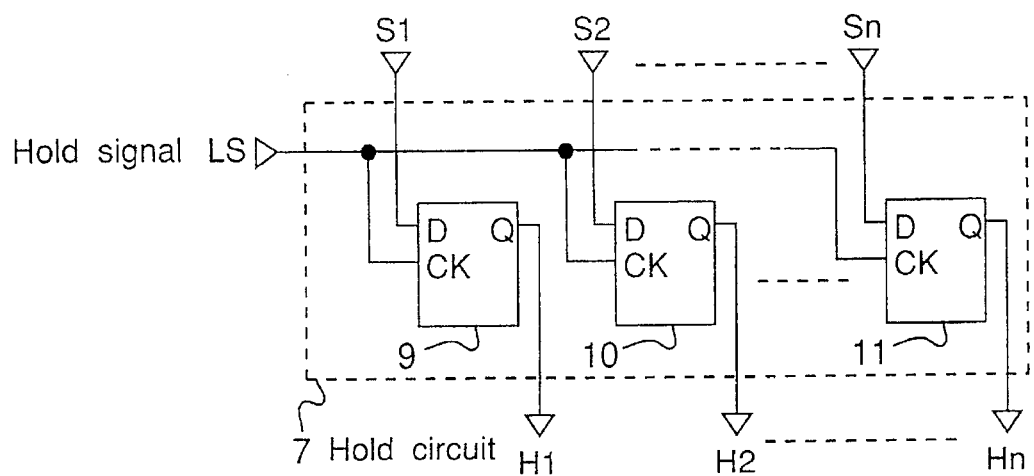
FIG. 13 is a circuit diagram of a hold circuit shown in FIG. 11.

The column electrode drive circuit 21 is composed of a shift register circuit 22, a sampling circuit 23, a hold circuit 24, and a level selector circuit 25 in the same manner as in the column electrode drive circuit 3 shown in FIG. 11. In the present case, the shift register circuit 22, sampling circuit 23, and level selector circuit 25 have the same constructions as those of the shift register circuit 5, sampling circuit 6, and level selector circuit 8 of the conventional column electrode drive circuit 3, and operate in same manner. The level selector circuit 25 constitutes one example of an output circuit of the present invention for outputting a voltage signal to a column electrode. It should be noted that for another example of the output circuit, there may be provided a circuit (not shown) which outputs a voltage signal having a level and a duty ratio corresponding to a display signal held by the hold circuit 24.

Meanwhile, the hold circuit 24 has a construction such that a clock signal CK' is input in addition to the hold signal LS to each element of the hold circuit 7 in the conventional column electrode drive circuit 3. The clock signal CK' is also input as a shift clock signal to the shift register circuit 22.

Figure 2:
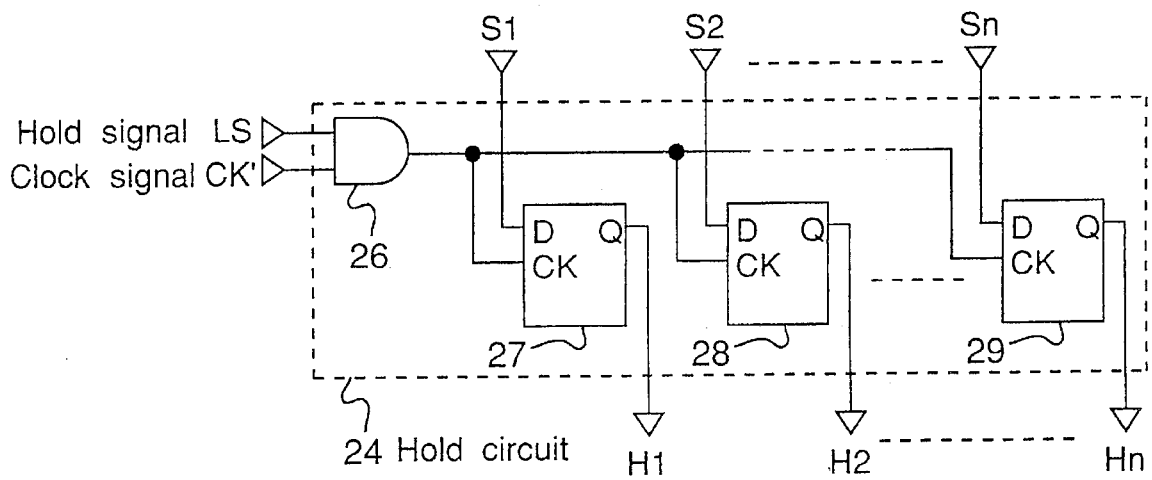
FIG. 2 is a circuit diagram of a hold circuit shown in FIG. 1.

FIG. 2 shows a circuit diagram of the hold circuit 24 of the present first embodiment.

The hold circuit 24 has D-flip-flops 27, 28, . . . , 29 as the aforementioned elements. Sampled display signals S1 through Sn input respectively to data terminals D of the D-flip-flops 27 through 29 are output as display signals H1 through Hn in synchronization with the clock signal CK' input to clock terminals CK and then held.

To the clock terminals CK of the D-flip-flops 27 through 29 of the hold circuit 24 of the present first embodiment is supplied an output signal from an AND circuit 26 which receives the inputs of the hold signal LS and the clock signal CK'.

Therefore, the AND circuit 26 outputs the clock signal CK' as it is when the hold signal LS has a high level of "H", and outputs a low level signal of "L" i.e. the hold signal LS when the hold signal LS has a low level of "L". It should be noted that the AND circuit 26 constitutes an example of a clock circuit signal supply circuit of the present invention.

Consequently, the D-flip-flops 27 through 29 of the hold circuit 24 output respectively the sampled display signals S1 through Sn transmitted from the elements of the sampling circuit 23 as the display signals H1 through Hn from output terminals Q in synchronization with the clock signal CK'. When the level of the hold signal LS changes to "L", the elements of the holding circuit 24 hold the display signals H1 through Hn appearing in the output.

The display signals H1 through Hn thus output from or held by the D-flip-flops 27 through 29 of the hold circuit 24 are input to the elements of the level selector circuit 25. By the operation of the elements of the level selector circuit 25, input voltages V1 through Vm corresponding to the display signals H1 through Hn are subjected to selection and output as voltage signals Y1 through Yn to the corresponding column electrodes 1-b.

In more detail, the column electrode drive circuit 21 of the present first embodiment outputs the voltage signals Y1 through Yn in accordance with a varied timing as follows depending on the waveform of the hold signal LS.

Figure 3:
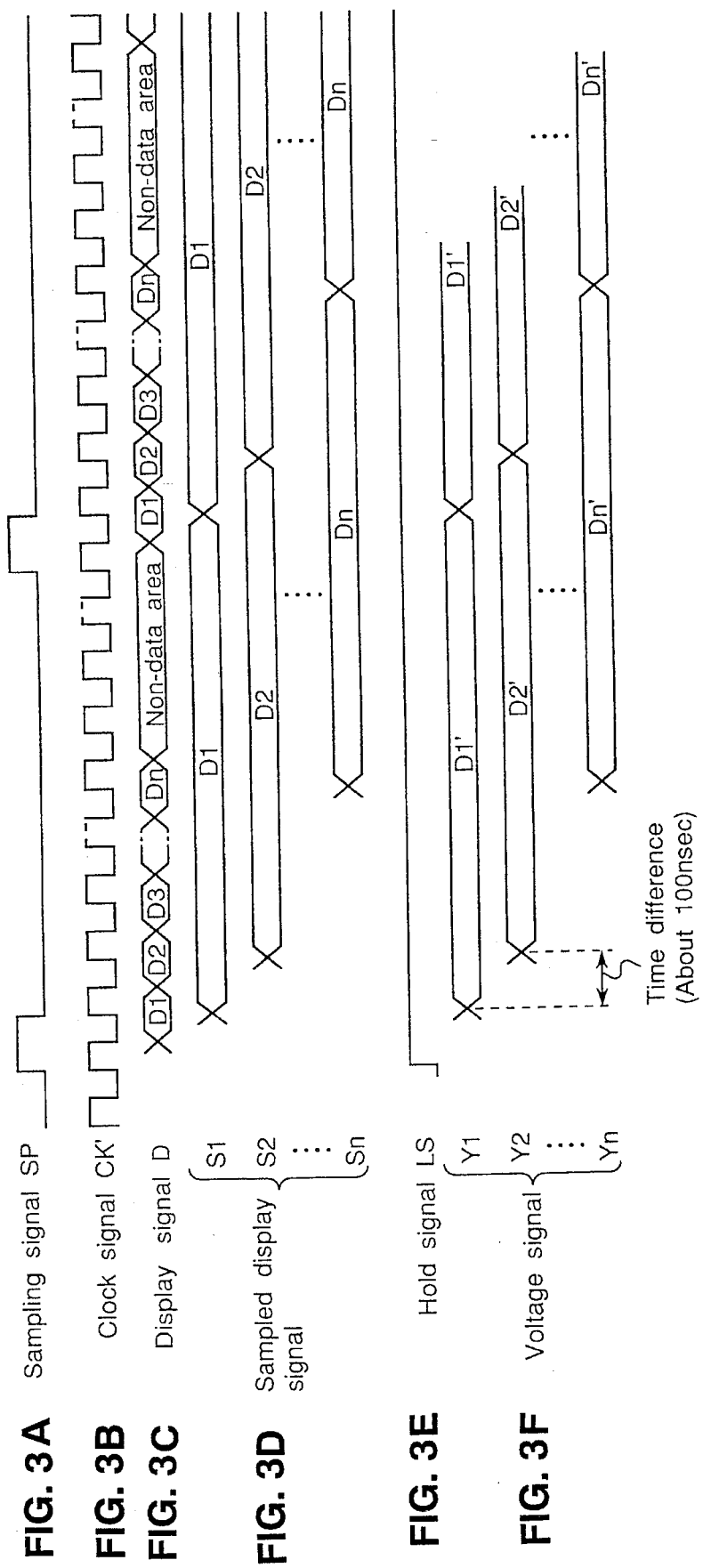
FIGS. 3a–3f are timing charts in a sequential output stage executed by the column electrode drive circuit shown in FIG. 1 having the hold circuit shown in FIG. 2.

(1) When the level of the hold signal LS is kept at a constant level of "H" in a manner as shown in FIG. 3, the voltage signals Y1 through Yn composed of the voltages V1 through Vm corresponding in level to the display signals D1 through Dn which are sampled by the sampling circuit 23 in synchronization with the clock signal CK' are sequentially output to the column electrodes 1-b of the LCD panel 1 in accordance with the same timing as that of the aforementioned sampling timing. In other words, the hold circuit 24 is put in a "through" state.

The state in which the voltage signals Y1 through Yn are sequentially output is referred to as the "sequential output" hereinafter.

Figure 4:
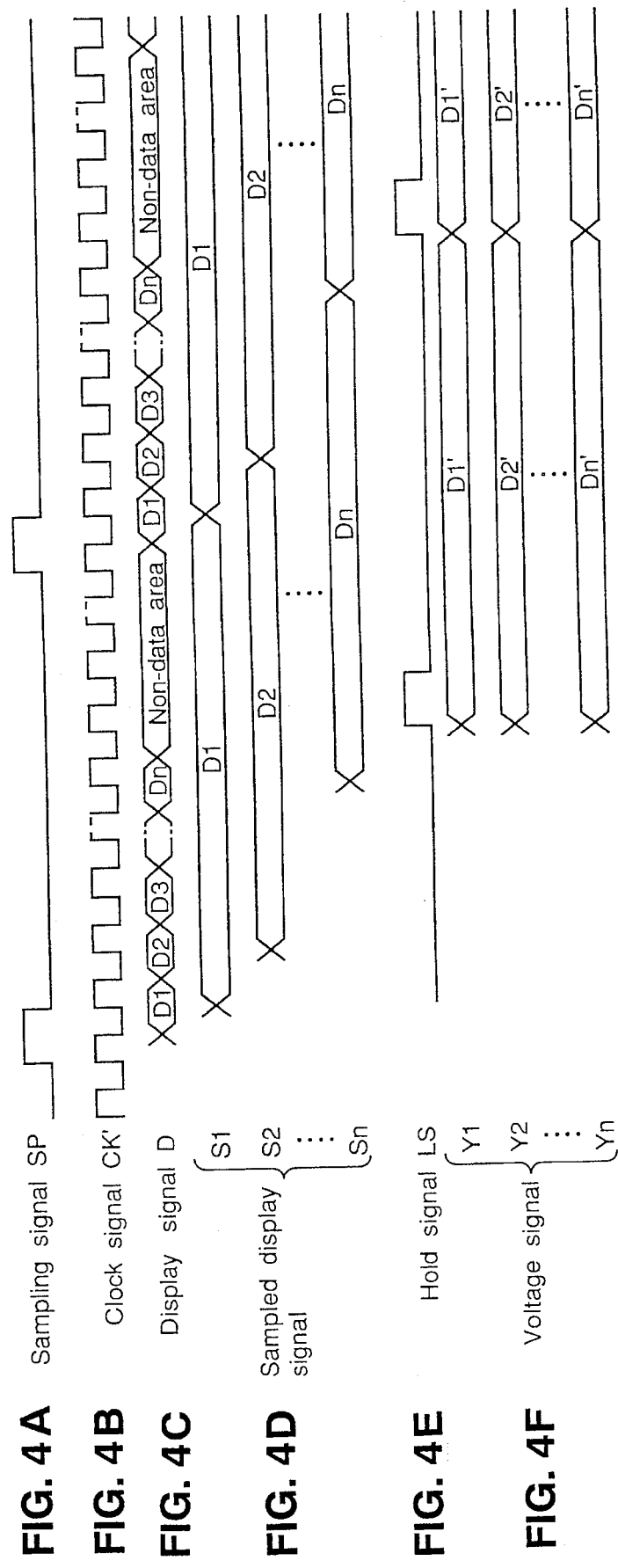
FIGS. 4a–4f are timing charts in a simultaneous output stage executed by the column electrode drive circuit shown in FIG. 1 having the hold circuit shown in FIG. 2.

(2) When the hold signal LS is a pulse signal in synchronization with the horizontal sync signal as shown in FIG. 4, the voltage signals Y1 through Yn each composed of selected one of the input voltages V1 through Vm according to the selecting operation of each element of the level selector circuit 25 in synchronization with the rise time of each pulse of the hold signal LS are simultaneously output to the column electrodes 1-b. Then in synchronization with the fall time of the pulse of the hold signal LS, the voltage signals Y1 through Yn output simultaneously are held.

The state in which the voltage signals Y1 through Yn are simultaneously output is referred to as the "simultaneous output" hereinafter.

By thus switching the hold signal LS between the signal at level "H" and the pulse signal in synchronization with the horizontal sync signal, the voltage signals Y1 through Yn output from the elements of the level selector circuit 25 to the column electrodes 1-b can be easily switched between the "sequential output" and the "simultaneous output".

In short, according to the present first embodiment, the AND circuit 26 constitutes a signal selector circuit.

In the column electrode drive circuit 21 having the aforementioned construction, the "sequential output" is executed in a vertical retrace interval, while the "simultaneous output" is executed in the image display period in one frame. In other words, the vertical retrace interval is utilized as the coordinate detection period.

Figure 5:
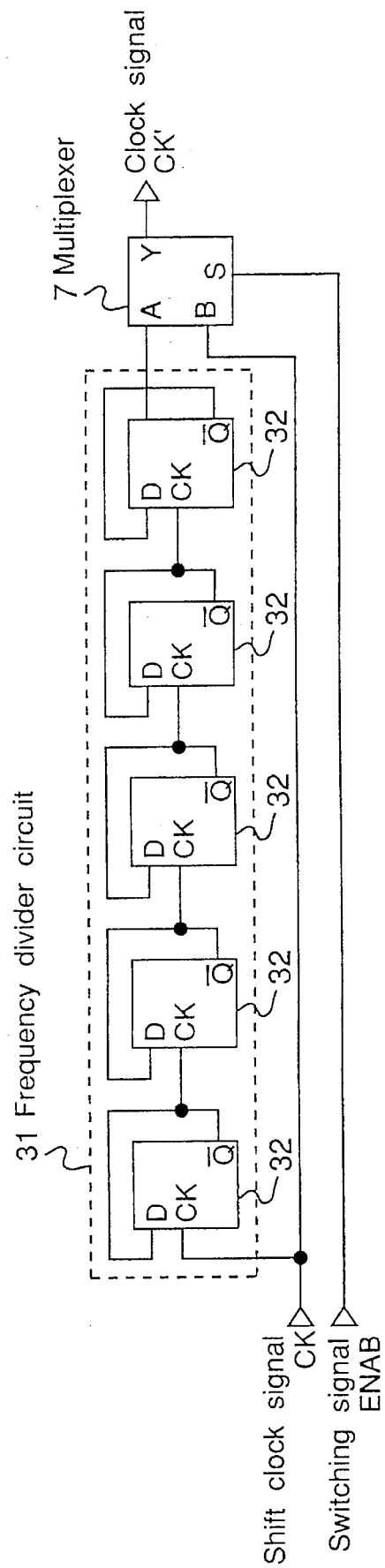
FIG. 5 is a diagram showing a multiplexer and a frequency divider circuit for generating a clock signal to be supplied to a shift register circuit and the hold circuit shown in FIG. 1.
Figure 6:
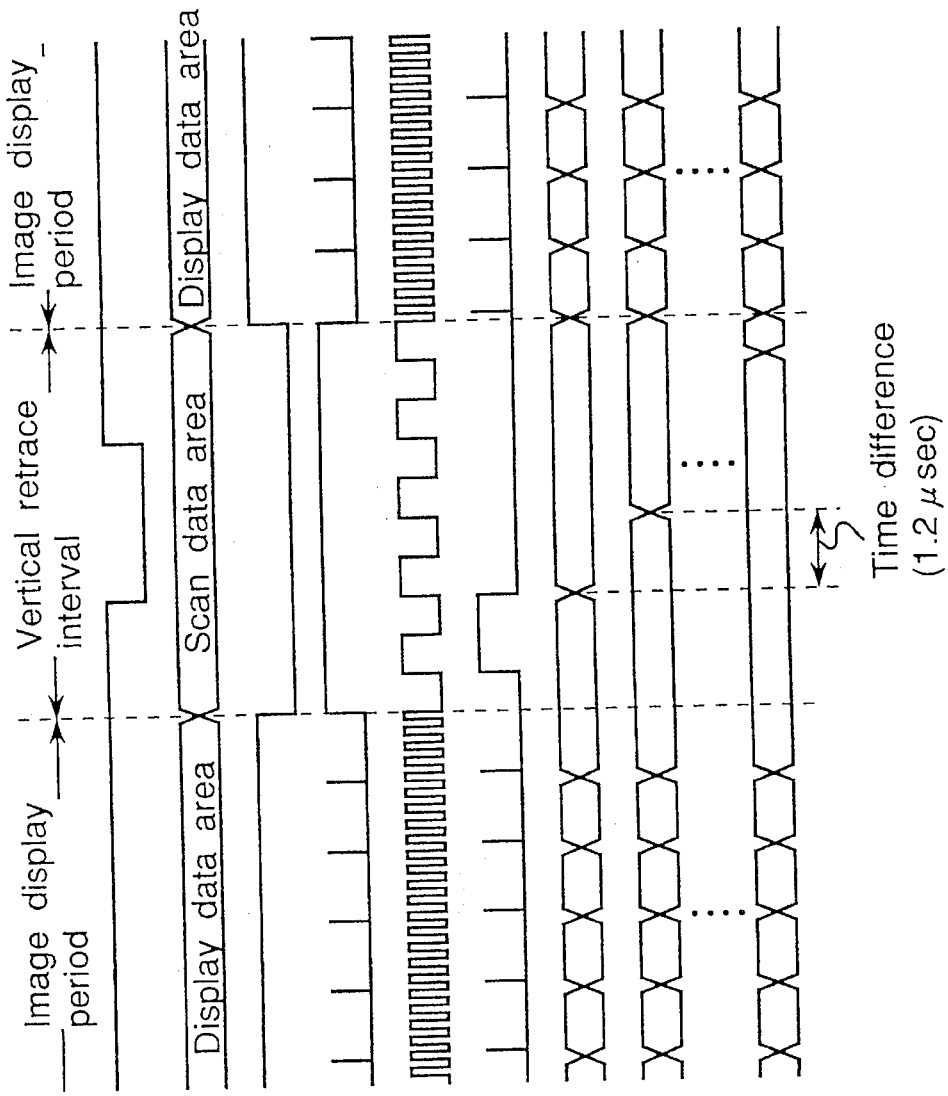
FIGS. 6a–6g are timing charts in the simultaneous output stage and the sequential output stage executed by the column electrode drive circuit shown in FIG. 1 having the multiplexer and the frequency divider circuit shown in FIG. 5 and the hold circuit shown in FIG. 2.

In the present first embodiment, a multiplexer 7 and a frequency divider circuit 31 as shown in FIG. 5 are connected to the input stage of the clock signal CK' in the shift register circuit 22 and the hold circuit 24.

The multiplexer 7 selects either one of an output signal which is output from the frequency divider circuit 31 and then input to its input terminal A and a shift clock signal CK input to its input terminal B according to the level of a switching signal ENAB input to its selection terminal S, and outputs the selected signal as the aforementioned clock signal CK' from its output terminal Y.

In short, according to the present first embodiment, the multiplexer 7 constitutes a switching circuit.

The frequency divider circuit 31 is composed of D-flip-flops 32, . . . in multiple stages (five stages in FIG. 5), and the shift clock signal CK is input to a clock terminal CK of the D-flip-flop 32 in the first stage, while an output signal from an output terminal Q of the D-flip-flop 32 in the fifth stage is input to the input terminal A of the multiplexer 7. To a data terminal D of each D-flip-flop 32 is input an output signal from an output terminal $\overline{Q}$ of the self D-flip-flop 32. The output signal from the output terminal $\overline{Q}$ is input to the clock terminal CK of the D-flip-flop 32 in the next stage.

In other words, each D-flip-flop 32 constitutes a binary divider, and therefore the frequency divider circuit 31 divides the shift clock signal CK by 32 and outputs the resulting signal to the multiplexer 7.

In the present case, the level of the switching signal ENAB is made to be "L" in the vertical retrace interval, and made to be "H" in the image display period. With the above-mentioned arrangement, when the level of the switching signal ENAB is at "H" in the image display period, the multiplexer 7 selects the input terminal B to output the shift clock signal CK as the clock signal CK'. When the level of the switching signal ENAB is "L" in the vertical retrace interval, the multiplexer 7 selects the input terminal A to output as the clock signal CK' the frequency-divided clock signal obtained by dividing by 32 the frequency of the shift clock signal CK in the frequency divider circuit 31.

With the above-mentioned arrangement, the frequency of the clock signal CK' which is input to the shift register circuit 22 and the hold circuit 24 in the vertical retrace interval can be 1/32 of the frequency in the image display period. As a result, the scanning frequency of the column electrodes 1-b in the vertical retrace interval (coordinate detection period) can be reduced even when the frequency of the shift clock signal CK for scanning the row electrodes 1-a in the image display period is high, which allows a great time difference to be set in the change of electric potential between the column electrodes 1-b.

As described above, in the present first embodiment, to the clock terminal CK of each of the D-flip-flops 27 through 29 constituting the hold circuit 24 is input as the output signal of the AND circuit 26 which receives the inputs of the hold signal LS and the clock signal CK'. Meanwhile, the clock signal CK' input to the shift register circuit 22 and the hold circuit 24 is obtained by switching in the multiplexer 7 between the shift clock signal CK and the frequency-divided clock signal obtained by dividing the frequency of the shift clock signal CK by 32 in the frequency divider circuit 31 based on the switching signal ENAB.

Therefore, as shown in FIGS. 6a–6g, by making the hold signal LS be the pulse signal and making the level of the switching signal ENAB be "H" in the image display period, there is executed the "simultaneous output" when the voltage signals Y1 through Yn corresponding to the display signals D1 through Dn sequentially sampled on the cycle of the shift clock signal CK are simultaneously output and held on the cycle of the hold signal LS.

Meanwhile, by making the hold signal LS be the signal at the constant level of "H" and making the level of the switching signal ENAB be "L" in the vertical retrace interval, there is executed the "sequential output" when the voltage signals Y1 through Yn corresponding to the display signals D1 through Dn sampled on the cycle of the clock signal obtained by dividing the frequency of the shift clock signal CK by 32 are sequentially output on the same cycle. Note that the display signal D in the vertical retrace interval is not corresponding to the display density of an image to be displayed on each pixel in contrast to the display signal D in the image display period. The display signal D in the vertical retrace interval is set up at a voltage which can facilitate easy discrimination between electric potentials at adjoining column electrodes 1-b by the selecting operation of the level selector circuit 25.

Thus the column electrode drive circuit 21 simultaneously applies the display voltages to the column electrodes 1-b in units of scanning of the row electrode 1-a in the image display period in the same manner as in the ordinary liquid crystal display device to allow an image to be displayed on the LCD panel 1. Meanwhile, in the vertical retrace interval (coordinate detection period), the column electrodes 1-b can be scanned by sequentially applying the scanning voltage to the column electrodes 1-b on a specified cycle.

Therefore, according to the present first embodiment, a column electrode drive circuit applicable to the display-integrated type tablet device can be provided.

The reason why the input shift clock signal CK is divided by 32 in the frequency divider circuit 31 of the aforementioned embodiment is as follows.

In accordance with a VGA (Video Graphics Array) standard timing, pulses of a horizontal sync signal corresponding to 525 lines are included in one vertical retrace period, in which the image display period corresponds to 480 lines and the vertical retrace interval corresponds to 45 lines. Meanwhile, in one horizontal period, the shift clock signal CK includes 800 clock pulses. Therefore, the shift clock signal CK in one vertical retrace interval includes 36000 clock pulses (=45 line×800 clock pulses/line).

It is required to execute the operation corresponding to one horizontal period having 800 clock pulses (i.e., one time of scanning of the column electrodes 1-b) in one vertical retrace interval, and therefore the frequency of the shift clock signal CK can be reduced to ⅟45. In circuit designing, it is easy to provide a circuit which divides the frequency by a power of two, i.e., execute frequency division by 2, frequency division by 4, . . . , frequency division by 32, . . . . Therefore, the "frequency division by 32" nearest to the frequency division by 45 is adopted as the optimum value of frequency division.

Assuming that the frequency of the shift clock signal CK is 25 MHz, the scanning cycle T of the column electrodes 1-b based on the clock signal obtained by dividing the frequency of the shift clock signal CK by 32 can be expressed as:

$$T = \tfrac{1}{25} MHz \times 32 \approx 1.2\ \mu sec.$$

Second Embodiment

In the present second embodiment, a column electrode drive circuit is composed of an analog circuit.

FIG. 7 shows a circuit diagram of a column electrode drive circuit 41 of a liquid crystal display device of the present second embodiment.

The column electrode drive circuit 41 is composed of a number of juxtaposed lines each formed by arranging in order a sampling gate Sg, a sampling capacitor CS, a transfer gate Tg, a hold capacitor CH, and an output buffer OB, the number corresponding to the number "n" of column electrodes 1-b.

To each line constituting the column electrode drive circuit 41 is input an analog display signal V. The display signal V passes through the sampling gates Sg1 through Sgn which are turned on for a specified period according to sampling signals SP1 through SPn sequentially input in accordance with a timing as shown in FIG. 8b. Then the sampling capacitors CS1 through CSn are charged with electric charges corresponding to the sampled voltages of the display signal V. In other words, the sampling gates Sg1 through Sgn and the sampling capacitors CS1 through CSn constitute the aforementioned sampling circuit.

When the sampling in one horizontal period is thus completed, a transfer signal Trf is simultaneously input to the transfer gates Tg1 through Tgn to simultaneously turn on all the transfer gates Tg1 through Tgn. Then the hold capacitors CH1 through CHn are charged with the electric charges accumulated in the sampling capacitors CS1 through CSn. When the charge is thus completed, the transfer gates Tg1 through Tgn are turned off.

The sampling gates Sg1 through Sgn and the transfer gates Tg1 through Tgn are made conductive to be turned on when the level of the sampling signals SP1 through SPn or the transfer signal Trf is at "H", and turned off when the level is at "L".

Thus the voltages corresponding to the sampled voltage of the display signal V generated by the electric charges accumulated in the hold capacitors CH1 through CHn are output as the voltage signals Y1 through Yn to the column electrodes 1-b via the output buffers OB1 through OBn.

Consequently, voltages corresponding to the display voltages Y1 through Yn are applied to the pixels 1-c (see FIG. 14) via the transistors which are in the "ON" state as connected to the row electrode 1-a to which the scanning pulse is applied by a row electrode drive circuit (not shown). As a result, a variable-density image corresponding to the display signal V is displayed on one line of the pixel matrix on the LCD panel 1.

Thus in the column electrode drive circuit 41, the electric charges successively taken in the sampling capacitors CS1 through CSn according to the cycle of the sampling signals SP1 through SPn are simultaneously output according to the transfer signal Trf.

Therefore, it can be found that, in order to sequentially scan the column electrodes 1-b by means of the column electrode drive circuit 41 having the aforementioned construction, the transfer gates Tg1 through Tgn are required to be opened.

Therefore, in the present second embodiment, an output signal of an OR circuit 99 which receives inputs of a transfer signal Trf i.e. a pulse signal synchronized with, for example, the horizontal sync signal HS and a control signal CS which is made to have "H" level in the vertical retrace interval (coordinate detection period) is input to the transfer gates Tg1 through Tgn. The OR circuit 99 constitutes a signal selector circuit.

With the above-mentioned arrangement, the transfer gates Tg1 through Tgn are simultaneously turned on by a pulse of the transfer signal Trf as shown in FIG. 9c in the image display period to execute the "simultaneous output". In the vertical retrace interval (coordinate detection period), the transfer gates Tg1 through Tgn are opened in a manner as shown in FIGS. 10a–10c to execute the "sequential output" when the voltages sampled on the cycle of the sampling signals SP1 through SPn are sequentially output as they are via the transfer gates Tg1 through Tgn.

In the above case, in a manner as shown in FIGS. 10a–10c, by setting the frequency of the sampling signals SP1 through SPn in the vertical retrace interval (coordinate detection period) at a frequency lower than the frequency in the image display period as shown in FIGS. 8a–8c, the scanning frequency of the column electrodes 1-b can be reduced to allow a great time difference to be set in the change of electric potential between the column electrodes 1-b.

As a means for reducing the frequency in the above-mentioned case, the frequency of the clock signal for shifting the sampling signals SP1 through SPn are required to be reduced by means of, for example, the multiplexer 7 and the frequency divider circuit 31 shown in FIG. 5. That is, the multiplexer 7 and the frequency divider circuit 31 are adopted in the second embodiment, too.

As described above, in the present second embodiment, by making the transfer signal Trf be the pulse signal and making the frequency of the sampling signals SP1 through SPn have a frequency for image display in the image display period, there is executed the "simultaneous output" when the voltage signals Y1 through Yn corresponding to the sampled voltages of the display signal V sampled on the normal cycle of the sampling signals SP1 through SPn are simultaneously output in synchronization with the transfer signal Trf.

In the vertical retrace interval, by making the transfer signal Trf be a signal at the level of "H" and making the sampling signals SP1 through SPn have a frequency lower than the frequency for image display, there is executed the "sequential output" when the voltage signals Y1 through Yn corresponding to the sampled voltages sequentially sampled on the slow cycle of the sampling signals SP1 through SPn are sequentially output.

Thus in the column electrode drive circuit 41, the display voltages are simultaneously applied to the column electrodes 1-b in units of scanning of the row electrode 1-a in the image display period in the same manner as in the ordinary liquid crystal display device to allow an image to be displayed on the LCD panel 1. In the vertical retrace interval (coordinate detection period), the scanning voltages are sequentially applied to the column electrodes 1-b on a specified cycle to allow the scanning to be executed.

Therefore, according to the present second embodiment, a column electrode drive circuit applicable to the display-integrated type tablet device can be provided.

It should be noted that the construction of the hold circuit or the frequency driver circuit of the present invention is not limited to the circuit construction as shown in FIG. 2 or FIG. 5.

As described above, the column electrode drive circuit of a liquid crystal display device of the present invention has the sampling circuit, hold circuit, and output circuit. The hold circuit is provided with the plural number of flip-flops which hold display signals input from the sampling circuit in synchronization with a hold signal supplied to their clock terminals to simultaneously output the display signals, and hold the display signals input from the sampling circuit in synchronization with a clock signal supplied to the clock terminals to sequentially output the display signals. The clock signal is supplied to the clock terminals of the flip-flops by means of a clock signal supply circuit. With the above-mentioned arrangement, when the clock signal is supplied to the clock terminals, the voltage signals output by means of the output circuit based on the display signals sequentially output from the flip-flops can be sequentially applied to respective column electrodes.

Therefore, by detecting the change of electric potential at each column electrode by means of an electronic pen when the shift clock signal is supplied to the clock terminals of the flip-flops, the position of the electronic pen on a LCD panel can be detected based on the timing of the change of the electric potential.

In other words, according to the present invention, a column electrode drive circuit of a liquid crystal display device applicable to the display-integrated type tablet device can be provided.

According to the column electrode drive circuit of a liquid crystal display device of an embodiment of the present invention, the hold signal is selected in the image display period and the clock signal is selected in the vertical retrace interval by a signal selector circuit which takes in the hold signal and the clock signal, and then output either signal to the clock terminals of the flip-flops. With the above-mentioned arrangement, the voltage signals can be simultaneously applied to the column electrodes based on the display signals output simultaneously by the flip-flops in the image display period. In the vertical retrace interval, the voltage signals can be sequentially applied to the column electrodes based on the display signals sequentially output from the flip-flops.

Therefore, according to the above embodiment, the selection between the simultaneous application and the sequential application of the voltage signals to the column electrodes can be controlled by the signal selector circuit.

According to the column electrode drive circuit of a liquid crystal display device of an embodiment, a frequency-divided clock signal obtained by dividing the frequency of a shift clock signal by a specified number is selected in the vertical retrace interval, and a shift clock signal is selected in the image display period by a switching circuit based on an external switching signal. With the above-mentioned arrangement, the sampling circuit and the hold circuit operate by taking in the frequency-divided clock signal instead of the shift clock signal in the vertical retrace interval to allow the display signals which have been sequentially sampled on a cycle of the frequency-divided clock signal longer than the cycle of the shift clock signal to be sequentially output to the output circuit.

Therefore, the time difference in applying the voltage signals to the column electrodes can be set at a great value to allow the change of electric potential between adjoining column electrodes to be easily discriminated.

The column electrode drive circuit of a liquid crystal display device of the present invention has the sampling circuit and the hold circuit. The hold circuit is provided with the plural number of transfer gates which switch the pass condition of sampled voltages from the sampling circuit between the "simultaneous output" and the "sequential output" according the selection of a transfer signal or a control signal, and a plural number of hold capacitors for holding electric charges corresponding to the sampled voltages which has passed through the transfer gates. A signal selector circuit selects the transfer signal or the control signal to output it to the transfer gates. With the above-mentioned arrangement, when the signal selector circuit selects the control signal to output it to the transfer gates, the voltages based on the sampled voltages which sequentially pass through the sampling gates can be sequentially applied to the column electrodes.

Therefore, when the supply of the transfer signal to the transfer gates is stopped and the supply of the control signal to the transfer gates is executed, the position of the electronic pen on the LCD panel can be detected based on the timing of the change of electric potential by detecting the change of electric potential at the column electrodes by means of the electronic pen.

In other words, according to the present invention, a column electrode drive circuit of a liquid crystal display device applicable to the display-integrated type tablet device can be provided.

According to the column electrode drive circuit of a liquid crystal display device of an embodiment, the transfer signal is supplied to the transfer gates in the image display period, while the control signal is supplied to the transfer gates in the vertical retrace interval by a gate circuit. With the above-mentioned arrangement, the voltages can be simultaneously applied to the column electrodes based on the sampled voltages which simultaneously pass through the transfer gates in the image display period. In the vertical retrace interval, the voltages can be sequentially applied to the column electrodes based on the sampled voltages which sequentially pass through the transfer gates.

Therefore, according to the above embodiment, the selection between the simultaneous application and the sequential application of the voltages to the column electrodes can be controlled by the transfer signal and the control signal.

According to the column electrode drive circuit of a liquid crystal display device of an embodiment, a frequency-divided clock signal obtained by dividing the frequency of shift clock signal by a specified number is selected in the vertical retrace interval, and a shift clock signal is selected in the image display period by the switching circuit based on an external switching signal. With the above-mentioned arrangement, the sampling circuit operates by taking in the frequency-divided clock signal in the vertical retrace interval to allow the sampled signals which have been sequentially sampled on a cycle of the frequency-divided clock signal longer than the cycle of the shift clock signal to be sequentially output as they are to the transfer gate.

Therefore, the time difference in applying the voltages to the column electrodes can be set at a great value to allow the change of electric potential between adjoining column electrodes to be easily discriminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A column electrode drive circuit of a liquid crystal display device, said column electrode drive circuit having a sampling circuit for sequentially sampling a display signal corresponding to display pixels in synchronization with a clock signal supplied thereto, a hold circuit for holding the display signal sampled, and an output circuit for outputting to each column electrode a voltage signal corresponding to the display signal held, said pixels of a column of a pixel matrix being connected to a column electrode via respective switching elements, wherein the hold circuit includes a plurality of flip-flops which are arranged in parallel with each other for holding the display signals input from the sampling circuit and in synchronization with a periodic hold signal supplied to a clock terminal of each of the flip-flops simultaneously outputting the display signals to the column electrodes, and for sequentially outputting the display signals sequentially input from the sampling circuit to the column electrodes in synchronization with the clock signal supplied to the clock terminal when a continuous hold signal is supplied to said hold circuit, and a clock signal supply circuit for supplying the same frequency clock signal supplied to the sampling circuit and the hold signal to the clock terminal of each of the flip-flops.

2. A column electrode drive circuit of a liquid crystal display device as claimed in claim 1, wherein the clock signal supply circuit is a signal selector circuit which takes in the hold signal and the clock signal to select and output the hold signal to the clock terminal of each of the flip-flops in an image display period, and to select and output the clock signal to the clock terminal in a vertical retrace interval.

3. A column electrode drive circuit of a liquid crystal display device as claimed in claim 1, further comprising a frequency divider circuit responsive to a shift clock signal having a given frequency for dividing the given frequency of the shift clock signal by a specified number to output a frequency-divided clock signal, and a switching circuit which selects the frequency-divided clock signal from the frequency divider circuit as the clock signal in a vertical retrace interval of the device and which selects the shift clock signal as the clock signal in an image display period of the device responsive to an external switching signal to selectively output the frequency-divided clock signal or the shift clock signal, said sampling circuit sequentially sampling the display signal on a cycle of the frequency-divided clock signal which is longer than a cycle of the given frequency of the shift clock signal based on the frequency-divided clock signal in the vertical retrace interval, and said hold circuit being responsive to the frequency-divided clock signal applied to the clock terminal of each of the flip-flops and sequentially outputting the display signals sequentially sampled on the cycle of the frequency-divided clock signal by the sampling circuit to the output circuit based on the frequency-divided clock signal in the vertical retrace interval.

4. A column electrode drive circuit of a liquid crystal display device as claimed in claim 2, further comprising a frequency divider circuit responsive to a shift clock signal having a given frequency for dividing the given frequency of the shift clock signal by a specified number to output a frequency-divided clock signal, and a switching circuit which selects the frequency-divided clock signal from the frequency divider circuit as the clock signal in the vertical retrace interval and which selects the shift clock signal as the clock signal in the image display period responsive to an external switching signal to selectively output the frequency-divided clock signal or the shift clock signal, said sampling circuit sequentially sampling the display signal on a cycle of the frequency-divided clock signal which is longer than a cycle of the given frequency of the shift clock signal based on the frequency-divided clock signal in the vertical retrace interval, and said hold circuit being responsive to the frequency-divided clock signal applied to the clock terminal of each of the flip-flops and sequentially outputting the display signals sequentially sampled on the cycle of the frequency-divided clock signal by the sampling circuit to the output circuit based on the frequency-divided clock signal in the vertical retrace interval.

5. A column electrode drive circuit of a liquid crystal display device as in claim 1 further comprising:

a clock signal producing circuit responsive to an external switching signal for producing a clock signal such that the frequency of the clock signal supplied to the sampling circuit and to the hold circuit is lower when the display signals are sequentially output from the hold circuit than when the display signals are simultaneously output to the column electrodes.

6. A column electrode drive circuit of a liquid crystal display device, said column electrode drive circuit having sampling circuits for sequentially sampling display signals corresponding to each pixel of a pixel matrix to sequentially produce sampled voltages in synchronization with a clock signal, and hold circuits for holding voltages corresponding to the sampled voltages produced by the sampling circuits, whereby the voltages held are applied to a column electrode connected to a switching element which are provided for each pixel of a pixel matrix, wherein the hold circuits comprise a plurality of transfer gates which are arranged in parallel with each other and which simultaneously pass sampled voltages from the sampling circuit in synchronization with a transfer signal input thereto, and which sequentially pass the sampled voltages produced by the sampling circuits to the column electrodes when a continuous control signal is input to the hold circuits, and a plurality of hold capacitors which are arranged in parallel with each other and which hold electric charges corresponding to the sampled voltages which have passed through the corresponding transfer gates, a signal selector circuit for selecting the transfer signal or the continuous control signal for input to the transfer gates, and a clock signal producing circuit responsive to an external signal for producing said clock signal such that the frequency of the clock signal is lower when the sampled voltages are sequentially passed than when the sampled voltages are simultaneously passed.

7. A column electrode drive circuit of a liquid crystal display device as claimed in claim 6, wherein the signal selector circuit is a gate circuit which outputs the transfer signal to the transfer gates in an image display period, and outputs the continuous control signal to the transfer gates in a vertical retrace interval.

8. A column electrode drive circuit in a liquid crystal display device as claimed in claim 7, wherein said clock signal producing circuit includes:

a frequency divider circuit responsive to a shift clock signal having a given frequency for dividing the given frequency of the shift clock signal by a specified number to output a frequency-divided clock signal, and a switching circuit which selects the frequency-divided clock signal from the frequency divider circuit as the clock signal in the vertical retrace interval, and which selects the shift clock signal as the clock signal in the image display period responsive to said external switching signal to selectively output the frequency-divided clock signal or the shift clock signal, said sampling circuits sequentially sampling the display signal and sequentially outputting the sampled voltages to the transfer gates on a cycle of the frequency-divided clock signal which is longer than a cycle of the given frequency of the shift clock signal based on the frequency-divided clock signal in the vertical retrace interval.

\* \* \* \* \*